(12) United States Patent
Werbach et al.

(10) Patent No.: US 9,696,194 B2
(45) Date of Patent: Jul. 4, 2017

(54) METHOD AND APPARATUS FOR A VIBRATORY METER

(71) Applicant: Micro Motion, Inc., Boulder, CO (US)

(72) Inventors: Christopher A Werbach, Longmont, CO (US); Gregory Treat Lanham, Longmont, CO (US)

(73) Assignee: Micro Motion, Inc., Boulder, CO (US)

( * ) Notice: Subject to any disclaimer, the term of this patent is extended or adjusted under 35 U.S.C. 154(b) by 174 days.

(21) Appl. No.: 14/652,508

(22) PCT Filed: Jan. 10, 2013

(86) PCT No.: PCT/US2013/020987
§ 371 (c)(1),
(2) Date: Jun. 16, 2015

(87) PCT Pub. No.: WO2014/109747
PCT Pub. Date: Jul. 17, 2014

(65) Prior Publication Data
US 2015/0330821 A1 Nov. 19, 2015

(51) Int. Cl.
*G01F 1/84* (2006.01)

(52) U.S. Cl.
CPC .......... *G01F 1/8413* (2013.01); *G01F 1/8404* (2013.01); *G01F 1/8472* (2013.01); *G01F 1/8477* (2013.01); *Y10T 29/4943* (2015.01)

(58) Field of Classification Search
CPC .... G01F 1/8413; G01F 1/8472; G01F 1/8404; G01F 1/8477; Y10T 29/4943
See application file for complete search history.

(56) References Cited

U.S. PATENT DOCUMENTS

| | | | |
|---|---|---|---|
| 4,781,069 A | 11/1988 | Mitzner | |
| 5,370,002 A * | 12/1994 | Normen | G01F 1/8413 73/861.355 |
| 7,004,037 B2 | 2/2006 | Andresen et al. | |
| 7,325,462 B2 * | 2/2008 | Bitto | G01F 1/8409 73/861.355 |
| 2006/0162468 A1 | 7/2006 | Hussain et al. | |
| 2009/0249891 A1 * | 10/2009 | Van Cleve | G01F 1/8409 73/861.357 |
| 2010/0299089 A1 * | 11/2010 | Stack | G01F 1/74 702/48 |
| 2010/0326203 A1 * | 12/2010 | Lanham | G01F 1/8418 73/861.354 |
| 2011/0247433 A1 * | 10/2011 | Werbach | G01F 1/8418 73/861.357 |
| 2015/0300860 A1 * | 10/2015 | Feng | G01F 1/8413 73/861.18 |

FOREIGN PATENT DOCUMENTS

| | | |
|---|---|---|
| EP | 1684055 A1 | 7/2006 |
| JP | 2009-526200 A | 7/2009 |
| WO | 2004017027 A1 | 2/2004 |
| WO | 2007074015 A1 | 7/2007 |
| WO | 2008059015 A1 | 5/2008 |

* cited by examiner

*Primary Examiner* — Francis Gray
(74) *Attorney, Agent, or Firm* — The Ollila Law Group LLC

(57) ABSTRACT

An apparatus (400) for a vibratory meter (100) having one or more flow tubes (101, 102) adapted to vibrate is provided. The apparatus (400) comprising two or more brace bars (203, 204) adapted to couple to the one or more flow tubes (101, 102), and an isolation bar (402) coupled to the two or more brace bars (203, 204).

24 Claims, 8 Drawing Sheets

METHOD AND APPARATUS FOR A VIBRATORY METER

BACKGROUND OF THE INVENTION

1. Field of the Invention

The present invention relates to a vibratory meter, and more particularly, to a method and apparatus for a vibratory meter.

2. Statement of the Problem

Vibrating conduit sensors, such as Coriolis mass flow meters and vibrating densitometers, typically operate by detecting motion of a vibrating conduit that contains a material. Properties associated with the material in the conduit, such as mass flow, density and the like, can be determined by processing measurement signals received from motion transducers associated with the conduit. The vibration modes of the vibrating material-filled system generally are affected by the combined mass, stiffness and damping characteristics of the containing conduit and the material contained therein.

A typical Coriolis mass flow meter includes one or more conduits that are connected inline in a pipeline or other transport system and convey material, e.g., fluids, slurries, emulsions, and the like, in the system. Each conduit may be viewed as having a set of natural vibration modes, including for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation. The instrumentation receives signals from the two pickoff sensors and processes the signals in order to derive a mass flow rate measurement, among other things. Vibratory meters, including Coriolis mass flow meters and densitometers, therefore employ one or more flow tubes that are vibrated in order to measure a fluid.

The techniques by which the vibrating Coriolis flow meters, measure parameters of a flowing material are well understood; see, for example, U.S. Pat. No. 6,505,131, the disclosure of which is hereby incorporated herein by reference; therefore, a detailed discussion is omitted for brevity of this description.

In vibrating Coriolis flow meters, the amplitude of the Coriolis deflections is considerably less than the amplitude of the flow tube drive frequency vibrations. Even though the amplitude of the Coriolis deflections is relatively small, it is the Coriolis deflections in the flow tube vibrations that generate the pick-off output signals that are processed by meter electronics to determine the mass flow rate and other parameters of the flowing material. Many vibrating Coriolis flow meters that generate pick off output signals from Coriolis deflections are capable of obtaining an output error of about 0.15% or less. However, in order to achieve this accuracy, interference of the Coriolis deflections are minimized. Although the above discussion addresses deflections in Coriolis flow meters, it should be understood that the deflections in other vibratory meters may be employed to measure parameters of the flowing material.

Vibratory meters are sometimes connected to other equipment that vibrates. For example, the pipelines the vibratory meters are connected to may be part of some equipment (e.g., semiconductor equipment, etc.). The equipment may have moving parts such as motors and pumps. These moving parts may impart a vibration to the equipment which in turn vibrates the pipelines connected to the vibratory meters. Moreover, the vibrations from the equipment may be imparted to the vibratory meters through means other than the manifold. For example, the vibratory meters may mount directly to the vibrating equipment which couples undesirable vibration to the flow tubes. Accordingly, the undesirable vibration in the pipelines or other parts of the equipment may transfer to the one or more flow tubes in the vibratory meter.

These undesirable vibrations may interfere with the Coriolis deflections which are used to measure the parameters of the material flowing through the flow tubes. This interference may increase the output error of the measurements of the flowing material. Increasing the output error in measurements of material is typically undesirable. Hence, there is a need to isolate a vibratory meter.

Aspects of the Invention

In one aspect of the invention, an apparatus (400) for a vibratory meter (100) having one or more flow tubes (101, 102) adapted to vibrate, comprising:

two or more brace bars (203, 204) adapted to couple to the one or more flow tubes (101, 102);

and an isolation bar (402) coupled to the two or more brace bars (203, 204).

Preferably, the two or more brace bars (203, 204) are coupled to the one or more flow tubes (101, 102).

Preferably, the isolation bar (402) includes an aperture (806*a*).

Preferably, the isolation bar (402) is adapted to isolate the vibratory meter (100).

Preferably, the one or more parameters of the isolation bar (402) are selected to isolate the vibratory meter (100).

Preferably, the one or more parameters selected includes a dimension of the isolation bar (402) selected to isolate the vibratory meter (100).

Preferably, the dimension of the isolation bar (402) selected to isolate the vibratory meter (100) is the width of the isolation bar (402).

Preferably, the dimension of the isolation bar (402) selected to isolate the vibratory meter (100) is a dimension of an aperture (806*a*) in the isolation bar (402).

Preferably, the isolation bar (402) is positioned to isolate the vibratory meter (100).

Preferably, the isolation bar (402) is adapted to isolate the one or more flow tubes (101, 102).

Preferably, the isolation bar (402) comprises a flat plate adapted to isolate the vibratory meter (100).

Preferably, the apparatus further comprises a second isolation bar (502) coupled to the two or more brace bars (203, 204).

In another aspect of the present invention, a method for a vibratory meter (100) having one or more flow tubes (101, 102) adapted to vibrate, comprising:

forming two or more brace bars (203, 204) adapted to couple to the one or more flow tubes (101, 102); and forming and coupling an isolation bar (402) to the two or more brace bars (203, 204).

Preferably, the method further includes coupling the two or more brace bars (203, 204) to the one or more flow tubes (101, 102).

Preferably, forming and coupling the isolation bar (402) to the one or more brace bars (203, 204) includes forming an aperture (806a) in the isolation bar (402).

Preferably, forming and coupling the isolation bar (402) to the two or more brace bars (203, 204) includes adapting the isolation bar (402) to isolate the vibratory meter (100).

Preferably, the forming and coupling the isolation bar (402) to the two or more brace bars (203, 204) includes selecting one or more parameters of the isolation bar (402) to isolate the vibratory meter (100).

Preferably, the selecting the one or more parameters of the isolation bar (402) includes selecting a dimension of the isolation bar (402).

Preferably, the selecting the dimension of the isolation bar (402) to isolate the vibratory meter (100) comprises selecting a width of the isolation bar (402).

Preferably, the selecting the dimension of the isolation bar (402) to isolate the vibratory meter (100) comprises selecting a dimension of an aperture (806a) in the isolation bar (402).

Preferably, the forming and coupling the isolation bar (402) includes positioning the isolation bar (402) to isolate the vibratory meter (100).

Preferably, the forming and coupling the isolation bar (402) to the two or more brace bars (203, 204) includes isolating the one or more flow tubes (101, 102).

Preferably, the forming and coupling the isolation bar (402) to the two or more brace bars (203, 204) includes isolating the vibratory meter (100).

Preferably, the method further includes forming and coupling a second isolation bar (502) to the two or more brace bars (203, 204).

In another aspect of the invention, a vibratory meter (100) having one or more flow tubes (101, 102), comprising:

two or more brace bars (203, 204) coupled to the one or more flow tubes (101, 102); and an isolation bar (402) coupled to the two or more brace bars (203, 204).

Preferably, the isolation bar (402) is adapted to isolate the vibratory meter (100).

DETAILED DESCRIPTION OF THE INVENTION

FIGS. 1-8 and the following description depict specific examples to teach those skilled in the art how to make and use the best mode of embodiments of a vibratory meter. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the vibratory meter. As a result, the embodiments described below are not limited to the specific examples described below, but only by the claims and their equivalents.

Figure 1:
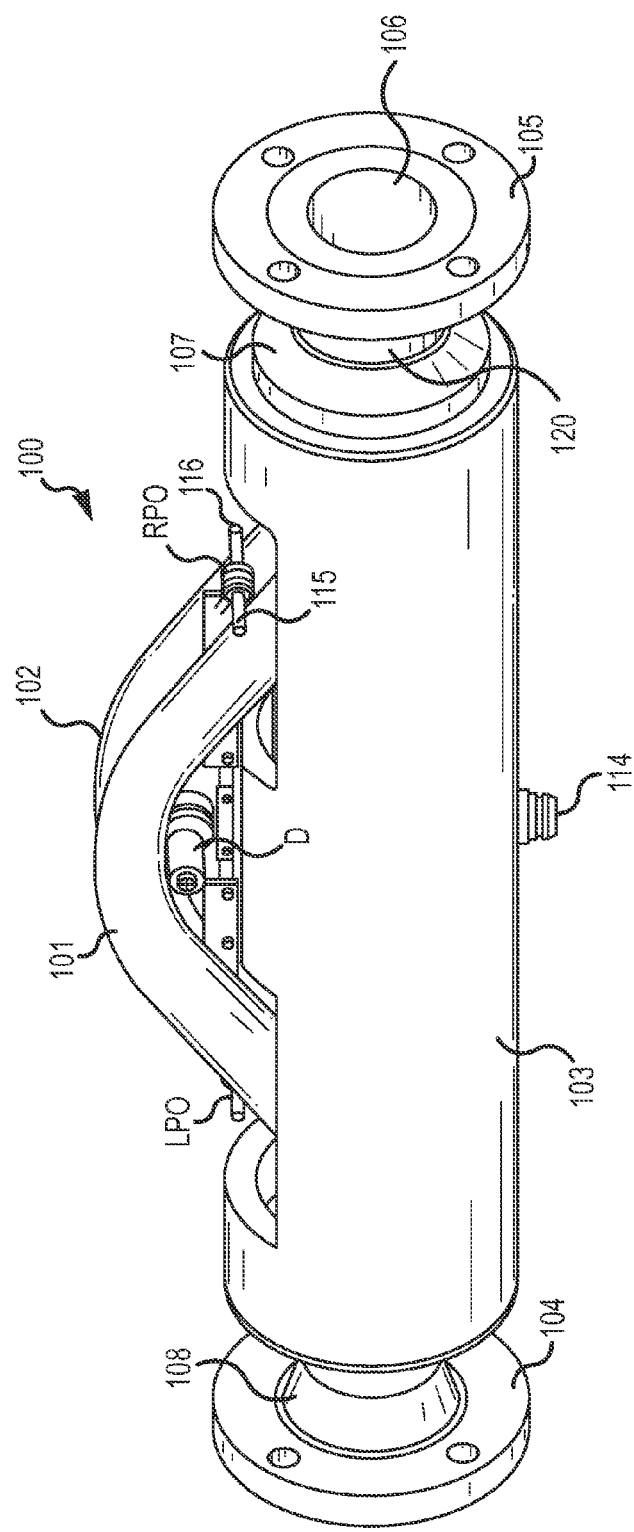
FIG. 1 shows a typical vibratory meter 100.

FIG. 1 shows a typical vibratory meter 100. As depicted, the vibratory meter 100 comprises a Coriolis flow meter. However, the present invention is not limited to applications incorporating Coriolis flow meters, and it should be understood that the present invention could be used with other types of vibratory meters. For example, densitometers may not require that the material flow through flow tubes 101 and 102 to measure density and other parameters of the material in the flow tubes 101 and 102. Additionally, the present invention can be used in applications other than vibratory meters where an apparatus employed in the application is subjected to undesirable vibrations or movements.

As depicted in FIG. 1, the vibratory meter 100 comprises a spacer 103 enclosing the lower portion of the flow tubes 101, 102 which are internally connected on their left ends to flange 104 via its neck 108 and which are connected on their right ends via neck 120 to flange 105, and manifold 107. Also shown in FIG. 1 are the outlet 106 of flange 105, left pick-off LPO, right pick-off RPO and driver D. The right pick-off RPO is shown in some detail and includes magnet structure 115 and coil structure 116. Element 114 on the bottom of manifold spacer 103 is an opening for receiving from meter electronics (not shown) a wire (not shown) that extends internally to driver D and pick-offs LPO and RPO. The meter 100 is adapted to be connected via flanges 104 and 105 to a pipeline or the like when in use.

Figure 2:
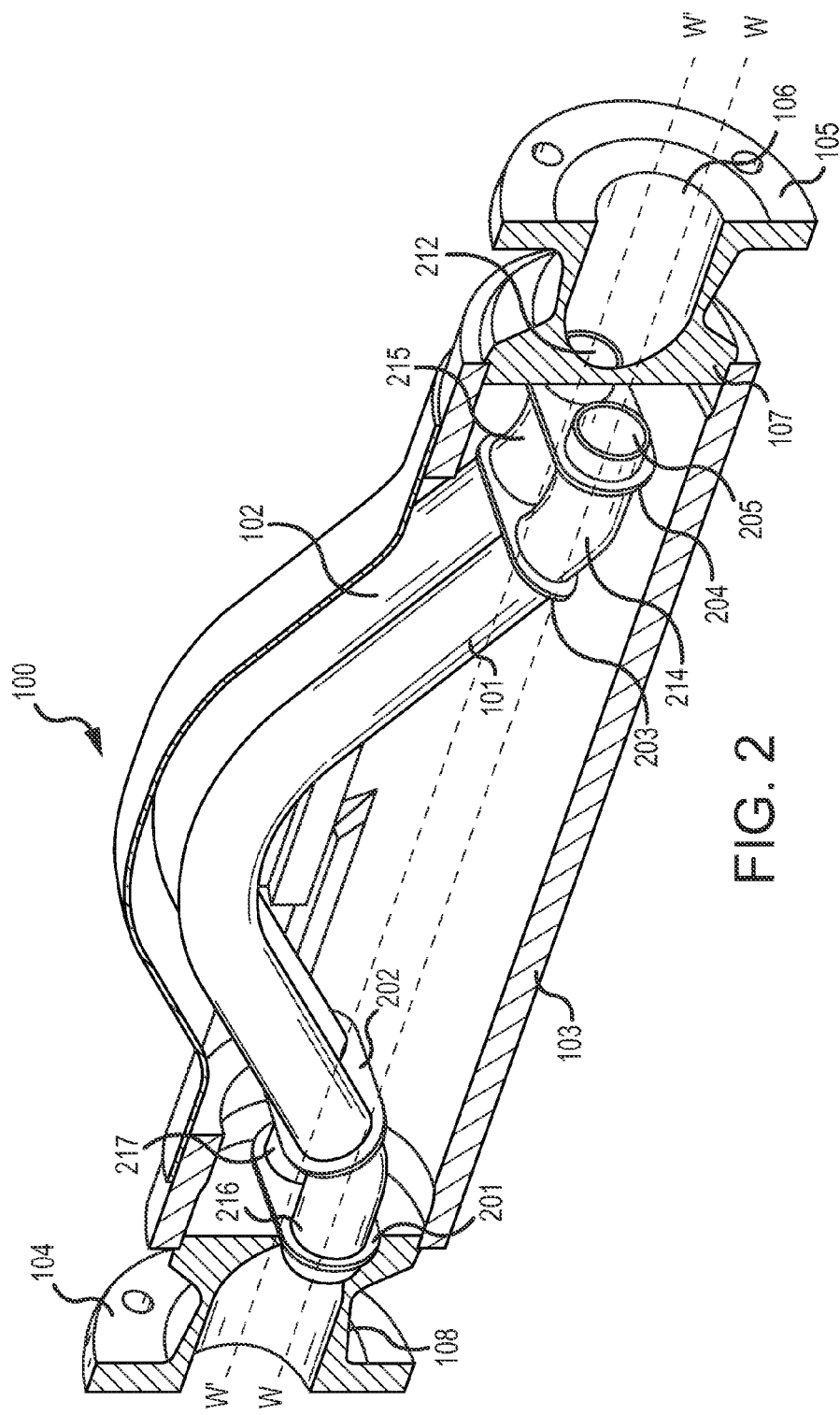
FIG. 2 shows a cut away view of the vibratory meter 100.

FIG. 2 shows a cut away view of the vibratory meter 100. This view removes the front portion of manifold spacer 103 so that parts internal to the manifold spacer may be shown. The parts that are shown on FIG. 2, but not on FIG. 1, include outer end brace bars 201 and 204, inner brace bars 202 and 203, right end flow tube outlet openings 205 and 212, the flow tubes 101 and 102, curved flow tube sections 214, 215, 216, and 217. In use, the flow tubes 101 and 102 are vibrated about their bending axes W and W' by the driver D. The outer end brace bars 201 and 204 and the inner brace bars 202 and 203 help determine the location of bending axes W and W'. As depicted, the flow tubes 101 and 102 are coupled to the manifold 107.

It is preferred that the vibratory meter 100 be isolated. For example, it is preferable that undesirable vibrations do not interfere with the Coriolis deflections in the vibratory meter 100. The interference of the undesirable vibrations on the Coriolis deflections may be reduced by isolating the vibratory meter 100. In one example, the interference of the undesirable vibrations on the Coriolis deflections may be reduced by isolating the flow tubes 101 and 102 from the flanges 104 and 105.

The Coriolis deflections may be somewhat isolated from the flanges 104 and 105 by employing the outer end brace bars 201 and 204 and the inner brace bars 202 and 203. However, even with the outer end brace bars 201 and 204 and inner brace bars 202 and 203 restraining the ends of the flow tubes 101 and 102, the Coriolis deflections may still be coupled to the flanges 104 and 105. Additional brace bars may further isolate the Coriolis deflections from the flanges 104 and 105.

Figure 3:
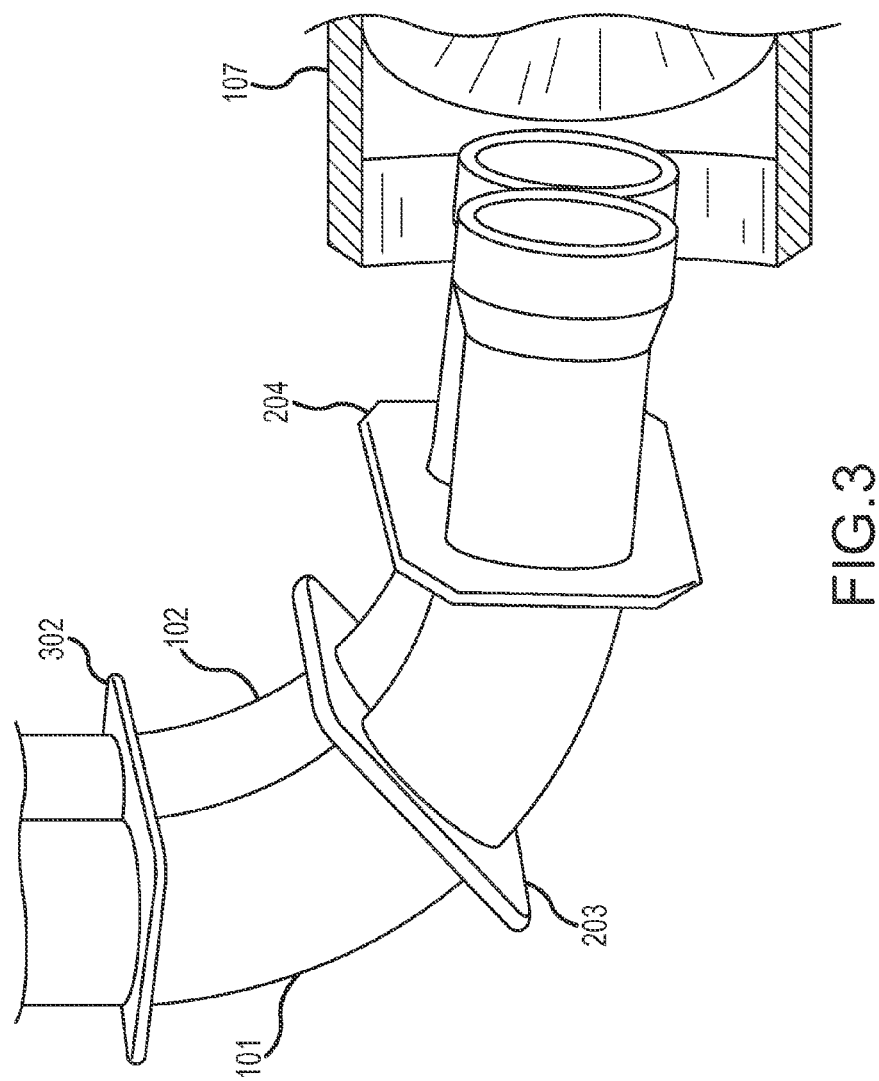
FIG. 3 shows a detailed isometric cut away view of the vibratory meter 100 at the inlet portion depicting an upper brace bar 302.

FIG. 3 shows a detailed isometric cut away view of the vibratory meter 100 at the inlet portion depicting an upper brace bar 302. The inlet portion of the vibratory meter 100 is selected as an exemplary view. Embodiments described herein with respect to the inlet portion of the vibratory meter 100 are equally applicable to the outlet portion of the vibratory meter 100.

As depicted in FIG. 3, the upper brace bar 302 is coupled to the flow tubes 101 and 102 at a distance from the inner brace bar 203. An analysis was performed to determine if the upper brace bar 302 isolated the Coriolis deflections from the flange 105. The analysis of this configuration showed that adding the upper brace bar 302 did further isolate of the Coriolis deflections from the flange 105. However, even with the upper brace bar 302, the Coriolis deflections were still somewhat coupled to the flange 105. Accordingly, different configurations of the inner brace bar 203, the outer end brace bar 204, and the upper brace bar 302 (e.g., more, thicker, different locations, etc.) may further decouple the Coriolis deflections from the flange 105.

Unfortunately, these other configurations may have undesirable costs. For example, an additional brace bar similar to the upper brace bar 302 may undesirably reduce the amount of space in the vibratory meter 100 available for other components such as sensors. Also, attaching the additional brace bar to the flow tubes 101 and 102 may be difficult thereby undesirably increasing the costs of the vibratory meter 100. A thicker upper brace bar 302 may be difficult to attach to the flow tubes 101 and 102 because the upper brace bar 302 may have to slide around a curve on the flow tubes 101 and 102 which might require an loose fit between the thicker upper brace bar 302 and the flow tubes 101 and 102.

In the following FIGS. 4-8, the present invention provides exemplary embodiments of methods and apparatus for the vibratory meter 100. For example, the embodiments depicted in the following FIGS. 4-8 isolate the Coriolis deflections from the flange 105. The embodiments depicted in FIGS. 4-8 may also be less costly to implement than other configurations that include the upper brace bar 302. The following describes analyses to determine if the Coriolis deflections are isolated from the flange 105. It is appreciated that any appropriate analysis may be employed to determine if an embodiment provided in accordance with the present invention isolates the vibratory meter 100.

Figure 4:
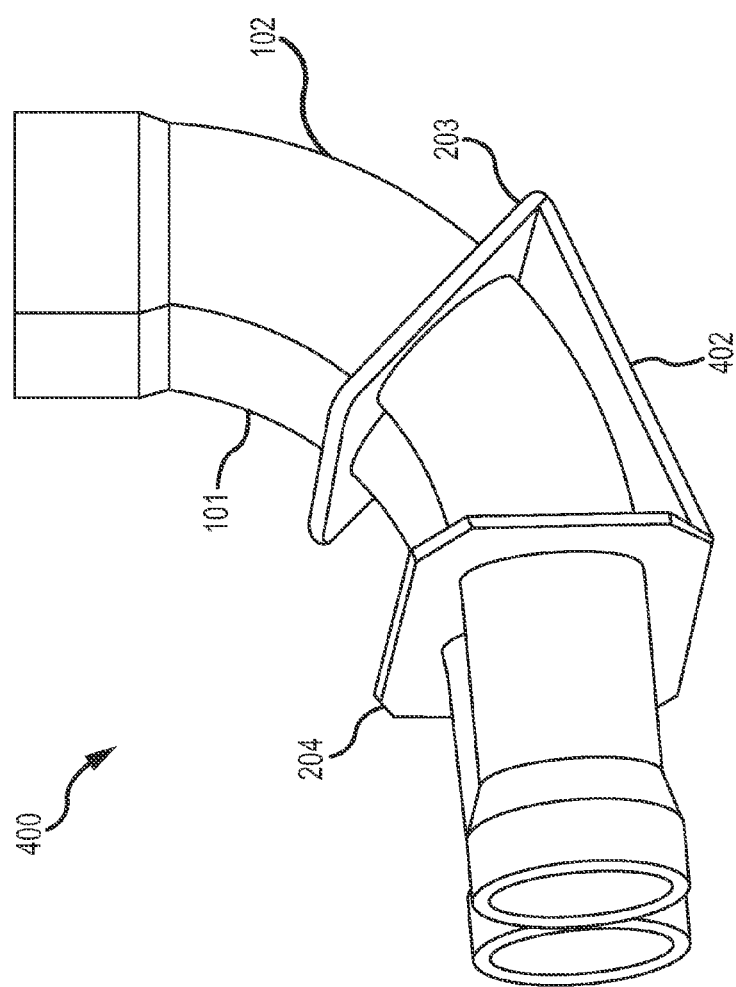
FIG. 4 shows a first apparatus 400 for the vibratory meter 100 provided in accordance with an embodiment of the invention.

FIG. 4 shows a first apparatus 400 for the vibratory meter 100 provided in accordance with an embodiment of the invention. As depicted in FIG. 4, the first apparatus 400 includes a lower isolation bar 402 that is coupled to the inner brace bar 203 and the outer end brace bar 204. The lower isolation bar 402 is depicted as attached (e.g., welded, soldered, etc.) to the inner brace bar 203 and the outer brace bar 204. Any suitable means of attaching the lower isolation bar 402 may be employed. In this or other embodiments, the lower isolation bar 402 may be formed (e.g., bent, forged, or the like) from the same piece of material as the inner brace bar 203 and the outer brace bar 204.

The lower isolation bar 402 may be adapted (e.g., designed, fabricated, and/or assembled) to isolate the vibratory meter 100. For example, the lower isolation bar 402 may, when coupled to the brace bars (203, 204), isolate the vibratory meter 100. The isolation may be in the form of isolating the vibratory meter 100 from vibrations. In the same or alternative embodiments, the lower isolation bar 402 may also isolate the Coriolis deflections from the flange 105. Also, parameters of the lower isolation bar 402 such as the dimensions (e.g., width, thickness, etc.) or the material properties may be selected to isolate the vibratory meter 100. Additionally or alternatively, the lower isolation bar 402 may be positioned (e.g., placed in a particular location on the brace bars (203, 204)) to isolate the vibratory meter 100.

Such selection of the parameters or the position of the lower isolation bar 402 may be performed in a software simulation, a prototype, and/or a fabrication of the vibratory meter 100. For example, a finite element analysis (FEA) model of the first apparatus 400 may include simulated flow tubes 101 and 102 that are vibrated by a simulated driver D. The software performing this simulation may then measure reaction forces at the flange 105. The greater the reaction forces at the flange 105 the more the Coriolis deflections are coupled to the flange 105. The more the Coriolis deflections are coupled to the flange 105 the less the vibratory meter 100 is isolated. Results from this FEA (or alternative analyses) may then be used to select different parameters or positions of the lower isolation bar 402.

As depicted in FIG. 4, the width and thickness of the lower isolation bar 402 is about the width and thickness of the brace bars 203 and 204. Additionally, the lower isolation bar 402 is depicted as a flat plate. An analysis of the first apparatus 400 for a vibratory meter 100 showed the lower isolation bar 402 further isolated the vibratory meter 100. In particular, the analysis showed the lower isolation bar 402 further isolated the Coriolis deflections from the flange 105 when compared to the upper brace bar 302.

In other embodiments the lower isolation bar 402 may have other shapes such as curved or triangular surface, etc. The lower isolation bar 402 may also be narrower or wider than the inner brace bar 203 and the outer end brace bar 204. Additionally or alternatively, the lower isolation bar 402 may have one or more apertures such as holes, slots, etc. These and other parameters of the isolation bar 402 may be selected to isolate the flow meter 100.

In other embodiments of the invention, more than one isolation bar may be provided. In these embodiments, parameters or positions of the isolation bars may be selected to isolate the vibratory meter 100 in a manner similar to that described with respect to the lower isolation bar 402. For example, parameters of one or more apertures in one or more isolation bars may be selected. In one embodiment, a side isolation bar may include an aperture that is a slot with a width and length selected to isolate the vibratory meter 100. In the same or alternative embodiments, the height of the side isolation bar may be less than the height of brace bars coupled to the side isolation bar so as to isolate the vibratory meter 100. Some of these additional embodiments are shown in the following figures. In each of the embodiments shown in the following figures, the one or more isolation bars did further isolate the Coriolis deflections from the flange 105 when compared to the upper brace bar 302.

Figure 5:
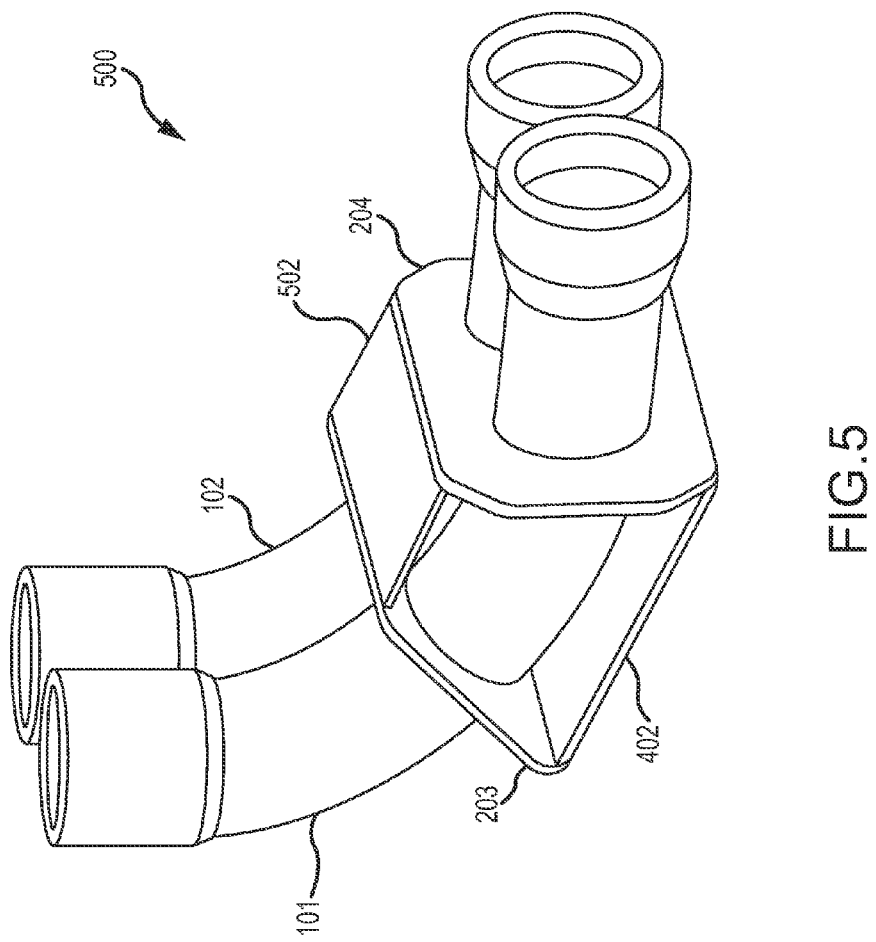
FIG. 5 shows a second apparatus 500 for the vibratory meter 100 provided in accordance with the present invention.

FIG. 5 shows a second apparatus 500 for the vibratory meter 100 provided in accordance with the present invention. As depicted, the second apparatus 500 includes an upper isolation bar 502 that is coupled to the inner brace bar 203 and the outer end brace bar 204 in addition to the lower isolation bar 402 previously depicted in FIG. 4.

Figure 6:
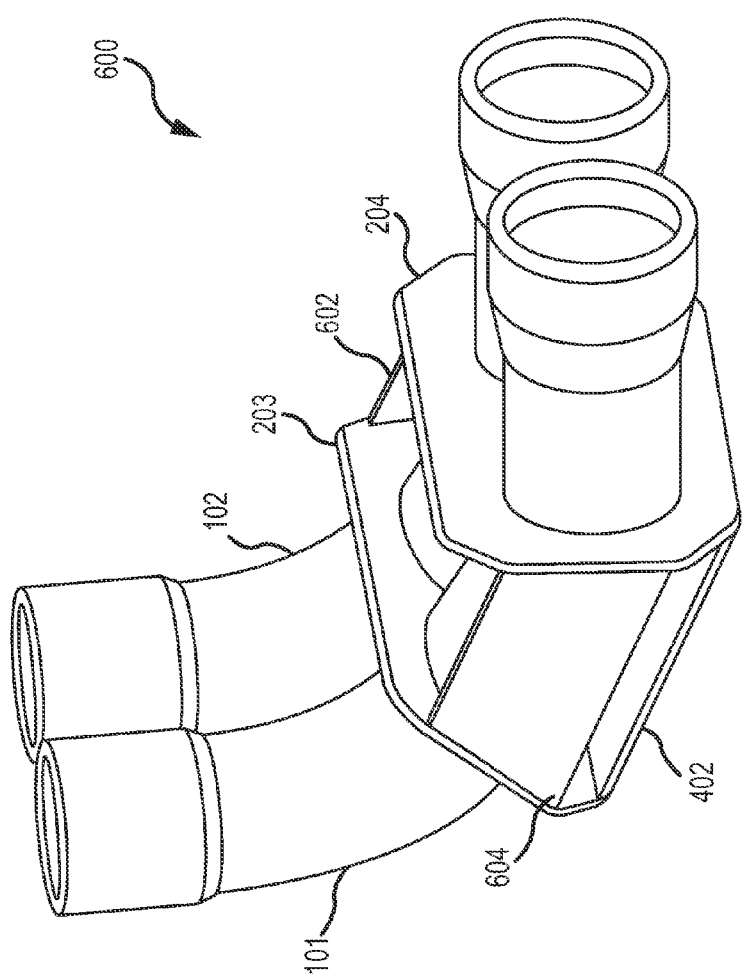
FIG. 6 shows a third apparatus 600 for the vibratory meter 100 provided in accordance with the present invention.

FIG. 6 shows a third apparatus 600 for the vibratory meter 100 provided in accordance with the present invention. As depicted, the third apparatus 600 includes a first side isolation bar 602 and a second side isolation bar 604. The third apparatus 600 also includes the lower isolation bar 402 depicted previously in FIGS. 4 and 5. However, the third apparatus 600 does not include the upper isolation bar 502 depicted in FIG. 5. The first side isolation bar 602 and the second side isolation bar 604 are depicted as coupled to the inner brace bar 203 and the outer brace bar 204. The first side isolation bar 602 and the second side isolation bar 604 are about the height of the inner brace bar 203 and the outer brace bar 204. In alternative embodiments, the heights of the first side isolation bar 602 and the second side isolation bar 604 may be different heights to isolate the flow meter 100. For example, the first side isolation bar 602 may have a height that is smaller than the height of the inner brace bar 203 and the outer brace bar 204. Also, more or fewer side isolation bars may be selected to isolate the vibratory meter 100.

Figure 7:
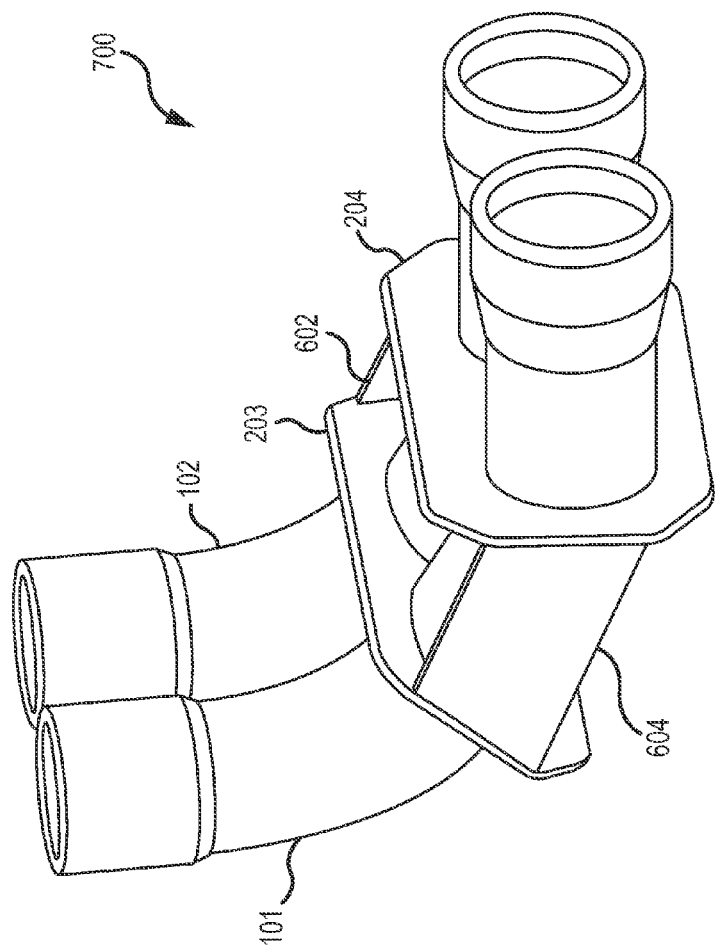
FIG. 7 shows a fourth apparatus 700 for the vibratory meter 100 provided in accordance with the present invention.

FIG. 7 shows a fourth apparatus 700 for a vibratory meter 100 provided in accordance with the present invention. As depicted, the fourth apparatus 700 includes the first side isolation bar 602 and the second side isolation bar 604 but does not include the lower isolation bar 402 depicted in FIG. 6.

Figure 8:
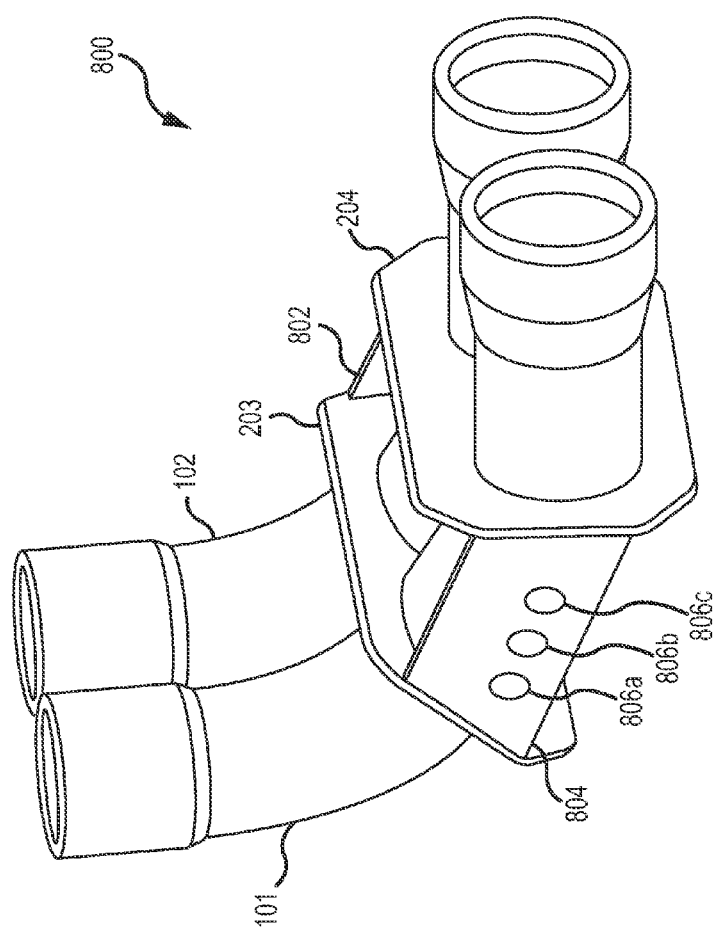
FIG. 8 shows a fifth apparatus 800 for the vibratory meter 100 provided in accordance with the present invention.

FIG. 8 shows a fifth apparatus 800 for a vibratory meter 100 provided in accordance with the present invention. As depicted, the fifth apparatus 800 includes a first side aperture isolation bar 802 and a second side aperture isolation bar 804 that are similar to the first side isolation bar 602 and the second side isolation bar 604 coupled to the inner brace bar 203 and the outer brace bar 204. The second side aperture isolation bar 804 includes apertures 806a, 806b, and 806c. The apertures 806a, 806b, and 806c are oval in shape. Apertures in the first side aperture isolation bar 802 are not shown. Parameters such as dimensions or shapes of the apertures 806a, 806b, and 806c may be selected to isolate the flow meter 100. For example, a length of a major axis of the oval shape of the apertures 806a, 806b, and 806c may be selected to isolate the flow meter 100. Although three apertures 806a, 806b, and 806c are depicted, more or fewer apertures may be selected to isolate the vibratory meter 100. Also, other aperture shapes may be selected such as square, circular, triangular, etc. The shapes may also be dissimilar. For example, triangle shaped apertures may be in the same isolation bar as oval shaped apertures. Although the apertures 806a, 806b, and 806c are depicted in the second side aperture isolation bar 804, any isolation bar may include apertures. For example, in another embodiment, a lower aperture isolation bar similar to the lower isolation bar 402 may include apertures.

The apparatus and method for a vibratory meter according to the invention can be employed according to any of the embodiments in order to provide several advantages, if desired.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Accordingly, the scope of the invention should be determined from the following claims.

What is claimed is:

1. An apparatus (400) for a vibratory meter (100) having one or more flow tubes (101, 102) adapted to vibrate, comprising:

two or more brace bars (203, 204) adapted to couple to the one or more flow tubes (101, 102); and
an isolation bar (402) coupled to the two or more brace bars (203, 204), wherein the isolation bar (402) includes an aperture (806a).

2. The apparatus (400) of claim 1 wherein the two or more brace bars (203, 204) are coupled to the one or more flow tubes (101, 102).

3. The apparatus (400) of claim 1 wherein the isolation bar (402) is adapted to isolate the vibratory meter (100).

4. The apparatus (400) of claim 3 wherein the isolation bar (402) is adapted to isolate the vibratory meter (100) by one or more parameters selected to isolate the vibratory meter (100).

5. The apparatus (400) of claim 4 wherein the one or more parameters selected includes a dimension of the isolation bar (402) selected to isolate the vibratory meter (100).

6. The apparatus (400) of claim 5 wherein the dimension of the isolation bar (402) selected to isolate the vibratory meter (100) is the width of the isolation bar (402).

7. The apparatus (400) of claim 5 wherein the dimension of the isolation bar (402) selected to isolate the vibratory meter (100) is a dimension of an aperture (806a) in the isolation bar (402).

8. The apparatus (400) of claim 1 wherein the isolation bar (402) is positioned to isolate the vibratory meter (100).

9. The apparatus (400) of claim 1 wherein the isolation bar (402) is adapted to isolate the one or more flow tubes (101, 102).

10. The apparatus (400) of claim 1 wherein the isolation bar (402) comprises a flat plate adapted to isolate the vibratory meter (100).

11. The apparatus (400) of claim 1 further comprising a second isolation bar (502) coupled to the two or more brace bars (203, 204).

12. A method for a vibratory meter (100) having one or more flow tubes (101, 102) adapted to vibrate, comprising:
forming two or more brace bars (203, 204) adapted to couple to the one or more flow tubes (101, 102);
forming and coupling an isolation bar (402) to the two or more brace bars (203, 204); and
forming an aperture (806a) in the isolation bar (402).

13. The method of claim 12 further comprising coupling the two or more brace bars (203, 204) to the one or more flow tubes (101, 102).

14. The method of claim 12 wherein the forming and coupling the isolation bar (402) to the two or more brace bars (203, 204) includes adapting the isolation bar (402) to isolate the vibratory meter (100).

15. The method of claim 14 wherein the adapting the isolation bar (402) includes selecting one or more parameters of the isolation bar (402) to isolate the vibratory meter (100).

16. The method of claim 15 wherein the selecting the one or more parameters of the isolation bar (402) includes selecting a dimension of the isolation bar (402) to isolate the vibratory meter (100).

17. The method of claim 16 wherein selecting the dimension of the isolation bar (402) to isolate the vibratory meter (100) comprises selecting a width of the isolation bar (402).

18. The method of claim 16 wherein the selecting the dimension of the isolation bar (402) to isolate the vibratory meter (100) comprises selecting a dimension of an aperture (806a) in the isolation bar (402).

19. The method of claim 12 wherein the forming and coupling the isolation bar (402) to the two or more brace bars (203, 204) includes positioning the isolation bar (402) to isolate the vibratory meter (100).

20. The method of claim 12 wherein forming and coupling the isolation bar (402) to the two or more brace bars (203, 204) includes isolating the one or more flow tubes (101, 102).

21. The method of claim 12 wherein forming and coupling the isolation bar (402) to the two or more brace bars (203, 204) includes isolating the vibratory meter (100).

22. The method of claim 12 further comprising forming and coupling a second isolation bar (502) to the two or more brace bars (203, 204).

23. A vibratory meter (100) having one or more flow tubes (101, 102), comprising:
    two or more brace bars (203, 204) coupled to the one or more flow tubes (101, 102); and
    an isolation bar (402) coupled to the two or more brace bars (203, 204), wherein the isolation bar (402) includes an aperture (806*a*).

24. The vibratory meter (100) of claim 23 wherein the isolation bar (402) is adapted to isolate the vibratory meter (100).

\* \* \* \* \*